US012388856B2

(12) United States Patent
Sinks et al.

(10) Patent No.: US 12,388,856 B2
(45) Date of Patent: Aug. 12, 2025

(54) DETECTION, VALIDATION, AND SOURCING OF MALICIOUS AI-GENERATED DISTRIBUTED DATA

(71) Applicant: Bank of America Corporation, Charlotte, NC (US)

(72) Inventors: Steven Sinks, Scottsdale, AZ (US); Jonathan Sheedy, Poynton (GB); Joshua Abraham, Sharon, MA (US)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 18/236,173

(22) Filed: Aug. 21, 2023

(65) Prior Publication Data

US 2025/0071129 A1 Feb. 27, 2025

(51) Int. Cl.
*H04L 9/40* (2022.01)
*G06F 3/04842* (2022.01)
*G06N 5/022* (2023.01)
*H04L 41/16* (2022.01)
*G06Q 50/20* (2012.01)

(52) U.S. Cl.
CPC ...... *H04L 63/1425* (2013.01); *G06F 3/04842* (2013.01); *G06N 5/022* (2013.01); *H04L 41/16* (2013.01); *H04L 63/1416* (2013.01); *G06Q 50/205* (2013.01)

(58) Field of Classification Search
CPC ... H04L 51/224; G06F 3/04842; G06N 5/022; G06Q 50/205
See application file for complete search history.

(56) References Cited

U.S. PATENT DOCUMENTS

| | | |
|---|---|---|
| 7,540,025 B2 | 5/2009 | Tzadikario |
| 8,006,305 B2 | 8/2011 | Aziz |
| 8,220,049 B2 | 7/2012 | Maynard |
| 8,375,444 B2 | 2/2013 | Aziz et al. |
| 8,549,638 B2 | 10/2013 | Aziz |
| 8,689,333 B2 | 4/2014 | Aziz |
| 8,984,638 B1 | 3/2015 | Aziz et al. |
| 9,356,944 B1 | 5/2016 | Aziz |
| 10,593,021 B1 | 3/2020 | Shen et al. |
| 11,082,435 B1 | 8/2021 | Aziz et al. |

(Continued)

*Primary Examiner* — Barbara B Anyan
(74) *Attorney, Agent, or Firm* — Banner & Witcoff, Ltd.

(57) ABSTRACT

An information security method to detect, validate, source, and/or remediate propagated, maliciously generated, AI content is disclosed. Search-engine spider(s) to crawl the Internet to identify posted content, which is analyzed with signature-based detection, anomaly detection, and machine learning to identify suspect content, which is compared against validated content. A malicious-AI probability score is generated based on the results of the foregoing AI analysis and the content differences. Metadata corresponding to the suspect content is extracted. A malicious activity mapping is compiled from available data. Suspect content is attempted to be recreated by publicly available online AI bots to identify the AI engine that generated the malicious content. Metadata pertaining to the origination source that accessed the source AI bot. Metadata is used to trace the malicious content back to the originator. Proofs regarding the foregoing are generated. Notifications/demands may be generated. Countermeasures against future attacks may be deployed.

20 Claims, 7 Drawing Sheets

(56) References Cited

U.S. PATENT DOCUMENTS

| | | | |
|---|---|---|---|
| 11,182,748 B1* | 11/2021 | Neckermann | G06N 5/022 |
| 2022/0337536 A1* | 10/2022 | Meersma | H04L 51/224 |
| 2022/0374105 A1* | 11/2022 | Seth | G06F 3/04842 |
| 2023/0050034 A1* | 2/2023 | Ben-Elazar | G06Q 50/205 |
| 2023/0066504 A1* | 3/2023 | Daha | G06V 20/46 |

* cited by examiner

DETECTION, VALIDATION, AND SOURCING OF MALICIOUS AI-GENERATED DISTRIBUTED DATA

TECHNICAL FIELD

The present disclosure relates to information security and, more particularly, to systems, methods, and apparatus for prevention of unauthorized use of data, including data modification and erroneous data creation, based on maliciously created artificial-intelligence-generated materials.

DESCRIPTION OF THE RELATED ART

Artificial intelligence (AI) can be utilized maliciously to generate erroneous data to manipulate legitimate data in such a manner that the AI-generated false data, erroneous code, or disinformation appears so real that it is hard to discern what is correct (or true) as opposed to what is incorrect (or false) by simply looking at the data, code, or information presented. This false information can then be propagated and distributed online in order to cause all manner of damage.

Existing attempts to address these issues are constrained currently in view of AI ability to interact with the real world in a way that could have a negative impact, which comes from limiting controls in their code base. Even now, prior art AI-implementations are discovering methods to bypass those controls to do simple things such as finding ways to create new languages when communicating with other AI systems. They have also been able to decipher an entire language by simply reviewing short segments of discourse from the unknown language. In both instances, the programmers who created these AI solutions still do not completely understand how either was possible.

The problem is how to deal with this malicious false data, erroneous code, or misinformation, which could have real world implications should AI engines either be compromised by an external threat actor such as what occurred in recent a cross-site scripting vulnerability to ChatGPT that allowed maliciously modified code to propagate disinformation about a business. This is further complicated by the possibility of malicious bypass of existing AI controls in order to post false data, code, or information to the public (or "real" world), or from company negligence or indifference that allows unconstrained access to AI engines. The foregoing presents real-world threats that are difficult to detect, validate, and source.

SUMMARY OF THE INVENTION

In accordance with one or more arrangements of the non-limiting sample disclosures contained herein, solutions are provided to address one or more of the shortcomings in the field of information security by, inter alia: (a) utilizing an information-security AI engine or platform to identify online content or data (e.g., on social media sites, web pages, repositories, news outlets, etc.) being propagated, distributed, posted or the like on the Internet that appears to be contrary to a known base of information; (b) comparing, by the AI engine, validated content in secure data stores or the like with the AI-identified online content in order to detect maliciously created false data, erroneous code, or misinformation; (c) performing pattern recognition on the online content or data in order to trace the source(s) and determine the method of the malicious activity based on, inter alia, discernable data such as timing, frequency, dates, authors, frequency, screen names, usernames, email addresses, metadata, IP addresses, routing data, ownership/attribution information, and/or any other detected information or characteristics etc. relating to the posts; (d) sourcing and tracking the malicious activity; (e) surreptitiously accessing—by masking the investigative source—online AI engines, hubs, or the like in an effort to recreate identical or substantially similar content in order to confirm that the malicious materials were generated by that particular AI engine, hub, or code base; (f) retrieving from the AI engines, hubs, or the like any metadata regarding any potential AI malicious activity such as IP address, location, login materials, etc. for the accessing threat vector; (g) scoring activity, performing trend analysis, and comparing against historical data to determine the likelihood and severity of the malicious activity; (h) generating alerts and/or automatic takedown notices or demands in response to the detected malicious activity along with reports and proof of the malicious activity; and/or (i) implementing countermeasures—including blocking threat-vector access to AI engines and the like—to mitigate and protect against the malicious activity.

Various solutions disclosed herein would allow an AI engine to analyze information from social media and new outlets looking for patterns of information being propagated that seem to be contrary to a known base of information, analogous to an automated PolitiFact checker but for all information tied to the applicable company. Various solutions could use known sources of fact as well as a company's externally published or internal document shares as a method of determining the potential for information being propagated to be false or misleading. Using these sources as a method of potential validation, solutions can report back to a management console, allowing an analyst to determine what needs to be actioned or not. Additionally, or alternatively, automatic actions may be taken. And any, or all, activities may be performed in real time when possible and may be performed in whole or in part in supervised, semi-supervised, or unsupervised modes.

In various aspects of this disclosure, identified items are found to be actionable, various bits of information can be gathered including the information relating to who owns the content such as domain ownership information, the date/time and user/person/entity supposedly pushing the disinformation as well as how the information differs from fact along with how it appears to be trending. Additionally, information on whether the trending analysis seems to be positive, neutral, or negative along with severities of each (such as significantly negative and why). This information could be wrapped into a report for a company's executive and legal teams to address and/or the solution could provide a method of report the potential threat vector to the offending entity requesting that they cease and desist with information linked back to the company's legal team should a company so determine said action is prudent.

Various aspects of the configurations contained herein enable a company or a third party to analyze media trends across the Internet looking for potential threat vectors from misinformation or disinformation that may exist that could potentially lead to a significantly negative impact on the company.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an information-security process for detection, validation, and sourcing of malicious AI-generated content distributed on the Internet can comprise one or more steps such as, for example: deploying, by an artificial intelligence (AI) engine, a search-engine spider to crawl the Internet to identify posted content propagated across online sources; analyzing, by the AI engine, the posted content using signature-based detection, anomaly detection, and machine learning to determine whether the posted content is suspect content that was potentially maliciously generated; comparing, by the AI engine, validated content against the suspect content in order to identify an extent of content differences; generating, by the AI engine, a malicious-AI probability score based on the signature-based detection, anomaly detection, and the machine learning, as well as the extent of the content differences. If the malicious-AI probability score exceeds a malicious-AI confidence threshold, one or more additions steps may be performed such as, for example: extracting, by the AI engine from the online sources, first metadata corresponding to the suspect content; compiling, by the AI engine, a malicious activity mapping; recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content; extracting, by the AI engine from the source AI bot, second metadata corresponding to an original creation of the suspect content; tracing, by the AI engine based on the second metadata, the suspect content back to an origination source; generating, by the AI engine, proof that the suspect content is false and that the source AI bot was maliciously used to create the suspect content; and issuing, by the AI engine, at least one notification regarding the suspect content, the origination source, the source AI bot, and the proof.

In some arrangements, the machine learning performs pattern recognition that is utilized by the AI engine in order to generate malicious-AI probability score.

In some arrangements, the process may include performing, by the AI engine based on the malicious activity mapping and the first metadata, a trend analysis to determine whether negative activity as a result of the suspect content is trending increasingly negative based on time.

In some arrangements, the malicious-AI probability score may be based on comparison to historical data relating to previously detected malicious campaigns.

In some embodiments, various types of metadata may include, inter alia, a post time, a post date, a posting IP address, posting user indicia, post keywords, other posts, posting frequencies and intervals, and other relevant information and indicia.

In some arrangements, suspect content may include text, code, data, images, and/or videos, some portions or all of which may be false or maliciously created or manipulated. Similarly, validated data stores may include valid text, valid code, valid data, valid images, and/or valid videos.

In some arrangements, countermeasures may be implemented or deployed in order to prevent or attempt to prevent further access to the source AI bot from the origination source, and/or to preempt access by the origination source to one or more of the other online AI bots.

In some arrangements, an automated, real-time, information-security process for detection, validation, sourcing, and remediation of malicious AI-generated content distributed on the Internet can comprising one or more of the steps of: deploying, by an artificial intelligence (AI) engine, a plurality of search-engine spiders to crawl the Internet in parallel to identify posted content propagated across online sources; analyzing, by the AI engine, the posted content using signature-based detection, anomaly detection, and machine-learning pattern recognition to generate threat-assessment results indicating whether the posted content is suspect content that was potentially maliciously generated; comparing, by the AI engine, validated content in validated data stores against the suspect content in order to identify an extent of content differences; generating, by the AI engine, a malicious-AI probability score based on threat-assessment results, the extent of the content differences, and historical data relating to previously detected malicious campaigns. If the malicious-AI probability score exceeds a malicious-AI confidence threshold, the process may perform one or more additional steps such as: extracting, by the AI engine from the online sources, first metadata corresponding to the suspect content, said first metadata including: a post time, a post date, a posting IP address, posting user indicia, and post keywords; detecting, by the AI engine, other posts corresponding to the posting user indicia in order to facilitate identification of the origination source for the suspect content; compiling, by the AI engine based on the first metadata, the suspect content the threat-assessment results, and the other posts, a malicious activity mapping that includes frequency timing data identifying post timing intervals for propagation of the suspect content; recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content; extracting, by the AI engine from the source AI bot, second metadata corresponding to an original creation of the suspect content; tracing, by the AI engine based on the second metadata, the suspect content back to an origination source; generating, by the AI engine, proof that the suspect content is false and that the source AI bot was maliciously used to create the suspect content; performing, by the AI engine based on the malicious activity mapping and the first metadata, a trend analysis to determine whether negative activity as a result of the suspect content is trending increasingly negative based on time; issuing, by the AI engine, at least one takedown demand to the online sources that includes the suspect content, the origination source, the source AI bot, and the proof; and deploying, by the AI engine, countermeasures to attempt to prevent future access by the origination source to the online AI bots.

In some arrangements, an automated, real-time, information-security process for detection, validation, sourcing, and remediation of malicious AI-generated content distributed on the Internet can comprise one or more steps such as: deploying, by an artificial intelligence (AI) engine, a plurality of masked search-engine spiders to surreptitiously crawl the Internet in parallel to identify posted content propagated across social-media online sources; analyzing, by the AI engine, the posted content using signature-based detection, anomaly detection, and machine-learning pattern recognition to generate threat-assessment results indicating whether the posted content is suspect content that was potentially maliciously generated; comparing, by the AI engine, validated content in validated data stores against the suspect content in order to identify an extent of content differences; generating, by the AI engine, a malicious-AI probability score based on threat-assessment results, the extent of the content differences, and historical data relating to previously detected malicious campaigns. If the malicious-AI probability score exceeds a malicious-AI confidence threshold, additional steps may be performed such as: surreptitiously extracting, by the AI engine from the social-media online sources, first metadata corresponding to the suspect content, said first metadata including: a post time, a post date, a posting IP address, posting user indicia, and post keywords; surreptitiously detecting, by the AI engine, other posts corresponding to the posting user indicia in order to facilitate identification of the origination source for the suspect content; compiling, by the AI engine based on the first metadata, the suspect content the threat-assessment results, and the other posts, a malicious activity mapping that includes frequency timing data identifying post timing intervals for propagation of the suspect content; surreptitiously recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content; surreptitiously extracting, by the AI engine from the source AI bot, second metadata corresponding to an original creation of the suspect content; tracing, by the AI engine based on the second metadata, the suspect content back to an origination source; generating, by the AI engine, proof that the suspect content is false and that the source AI bot was maliciously used to create the suspect content; performing, by the AI engine based on the malicious activity mapping and the first metadata, a trend analysis to determine whether negative activity as a result of the suspect content is trending increasingly negative based on time; issuing, by the AI engine, at least one takedown demand to the social-media online sources that includes the suspect content, the origination source, the source AI bot, and the proof; and deploying, by the AI engine, countermeasures to attempt to prevent future access by the origination source to the online AI bots.

In some arrangements, one or more various steps or processes disclosed herein can be implemented in whole or in part as computer-executable instructions (or as computer modules or in other computer constructs) stored on computer-readable media. Functionality and steps can be performed on a machine/engine/platform/bot or distributed across a plurality of machines/engines/platforms/bots that are in communication with one another. The processes described herein may be fully or partially automated, may be performed in whole or in part in real time, and may be implemented in a supervised, semisupervised, or unsupervised manner. Steps may be performed in any manner desired in order to obtain the optimum desired result depending on the particular problem being addressed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 2 illustrates online content detected by search engines and analyzed by an AI platform as well as compared against validated data stores along with depictions of sample metadata for online content and sample components or modules for execution and implementation in AI engines/platforms/hubs or the like.

DETAILED DESCRIPTION

Figure 1:
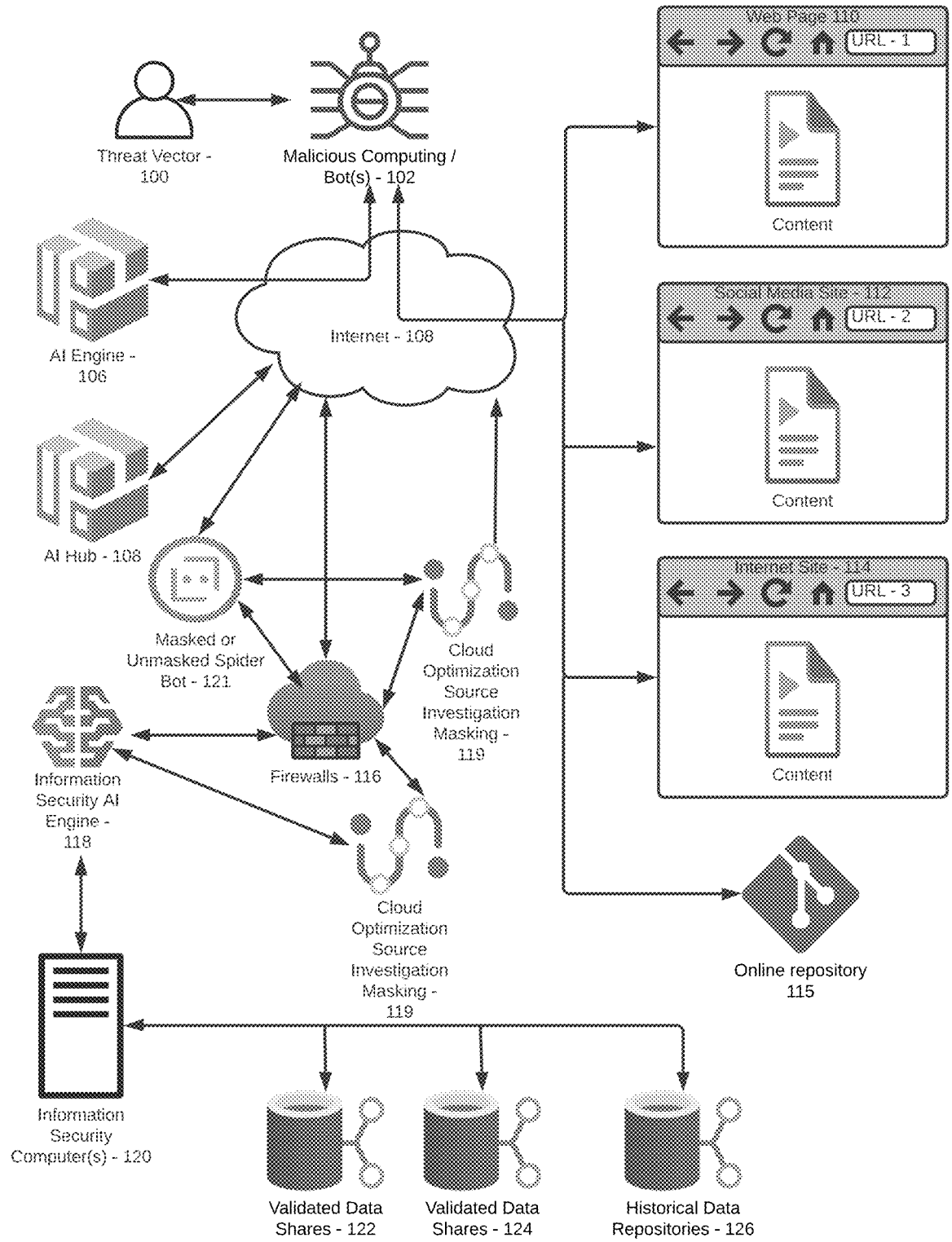
FIG. 1 depicts a sample functional diagram illustrating sample interactions, interfaces, steps, functions, and components in accordance with one or more information-security aspects of this disclosure as they relate to detection, validation, sourcing, and/or remediation of malicious AI-generated content propagated across the Internet via a plurality of online sites.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a sample functional diagram illustrating sample interactions, interfaces, steps, functions, and components in accordance with one or more information-security aspects of this disclosure as they relate to detection, validation, sourcing, and/or remediation of malicious AI-generated content propagated across the Internet via a plurality of online sites.

Threat vector or actor 100 can directly, or indirectly through use of malicious computing bot(s) 102, access a publicly available AI engine 106 or bot through the Internet. The threat vector 100 can then utilize the AI engine to maliciously generate false content as described in more detail in FIG. 4 below.

False content can then be propagated across the Internet to web pages 110, social media sites 112, Internet sites 114, as well as repositories 115 or any other online sources (not separately shown).

One or more masked or unmasked spider engine bots 121 may crawl the Internet, in parallel, if desired, in order to identify posted content. Spider engine bots 121 may be connected directly to the Internet or indirectly through a masking entity 119. Posted content may then be retrieved and analyzed by an information security AI engine/hub/platform 118, which may reside behind a firewall 116 for safety purposes. Posted content may be compared by information security computers 120 or the like against validated content in validated data shares 122 and 124 as well as viewed in the context of historical data repositories 126 with respect to prior detections of maliciously generated AI content.

There are a number of different approaches that can be used to detect malicious activity, such as, for example, signature-based detection, which utilizes known signatures of malicious code or traffic. When a signature is detected, it is an indication that malicious activity is occurring. Another example is anomaly detection, which looks for deviations from normal behavior. When a deviation is detected, it is an indication that malicious activity may be occurring. Yet another example is machine learning, which uses machine learning algorithms to identify malicious activity. Machine learning algorithms can learn to identify patterns in data that may indicate malicious activity, even if those patterns are not known in advance.

A combination of these approaches is preferably used in some configurations in order to provide a more comprehensive view of malicious activity. For example, a signature-based detector can be used to identify known threats, while an anomaly detector can be used to identify new or unknown threats. Machine learning algorithms can also be used to improve the accuracy of both signature-based and anomaly detection.

Threat intelligence platforms or malicious activity platforms may also be used to collect, analyze, and map information about threats and malicious activity based on data acquired from a variety of sources and including their corresponding metadata.

Figure 2:
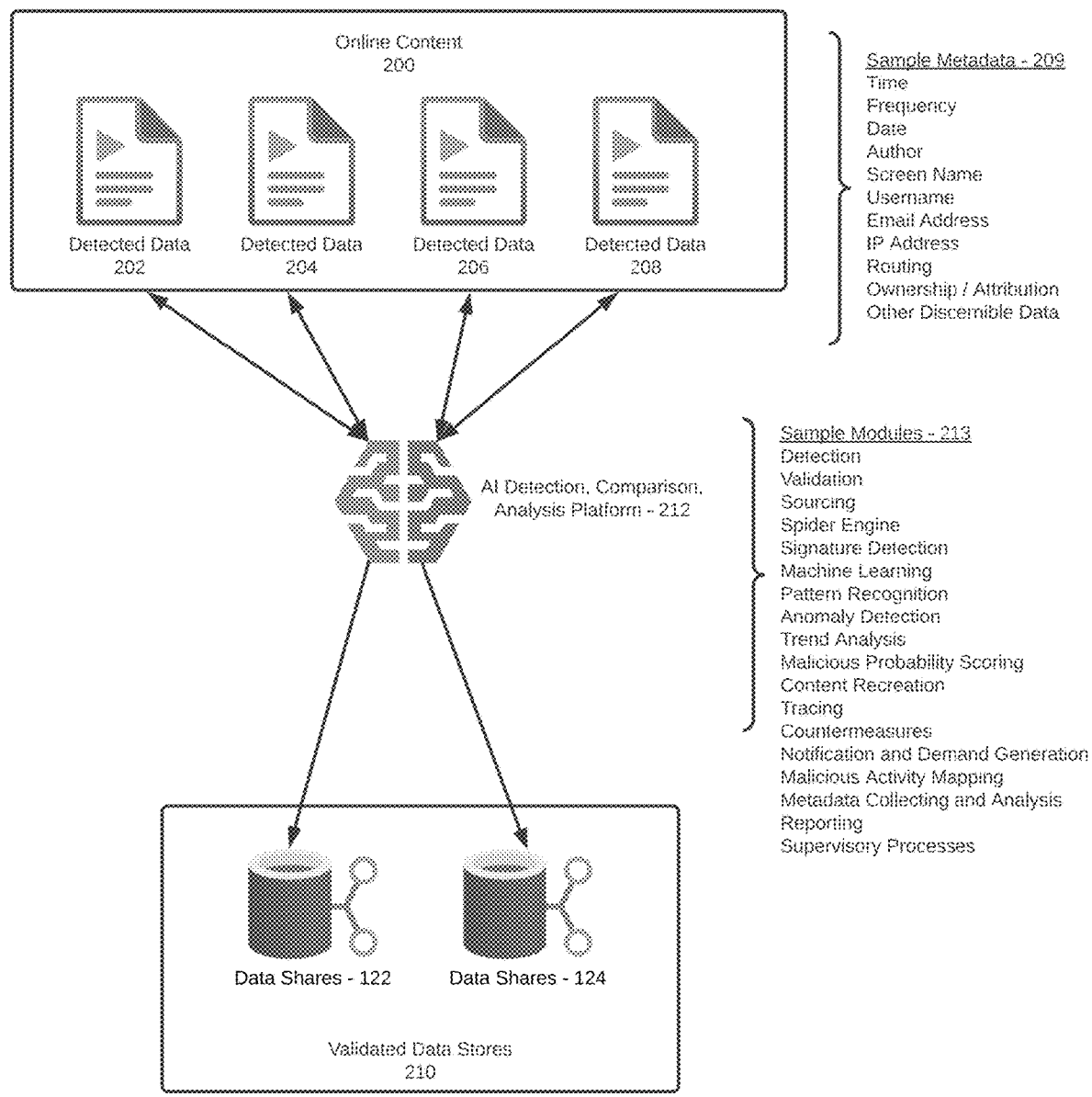

FIG. 2 illustrates online content detected by search engines and analyzed by an AI platform as well as compared against validated data stores along with depictions of sample metadata for online content and sample components or modules for execution and implementation in AI engines/platforms/hubs or the like.

Online content 200 includes various detected content or data 202, 204, 206, 208 (e.g., posted content), which can be identified by the spider engines. This content or data will have metadata 209 associated with it including, by way of non-limiting example, one or more information relating to: Time, Frequency, Date, Author, Screen Name, Username, Email Address, IP Address, Routing Information, Ownership/Attribution, and/or other Discernible Data.

The online content 200 may be compared against the validated content in data shares 122 and 124 by an AI detection, comparison, analysis platform 212 or the like. Such an AI engine or system, or information security computer controlling the AI system, may include various modules for performing the requisite processes. Sample components include one or more of modules for: Detection, Validation, Sourcing, Spider Engine Searching, Signature Detection, Machine Learning, Pattern Recognition, Anomaly Detection, Trend Analysis, Malicious Probability Scoring, Suspect Content Recreation, Tracing, Countermeasures, Notification and Demand Generation, Malicious Activity Mapping, Metadata Collecting and Analysis, Reporting, and Supervisory Processes.

Figure 3:
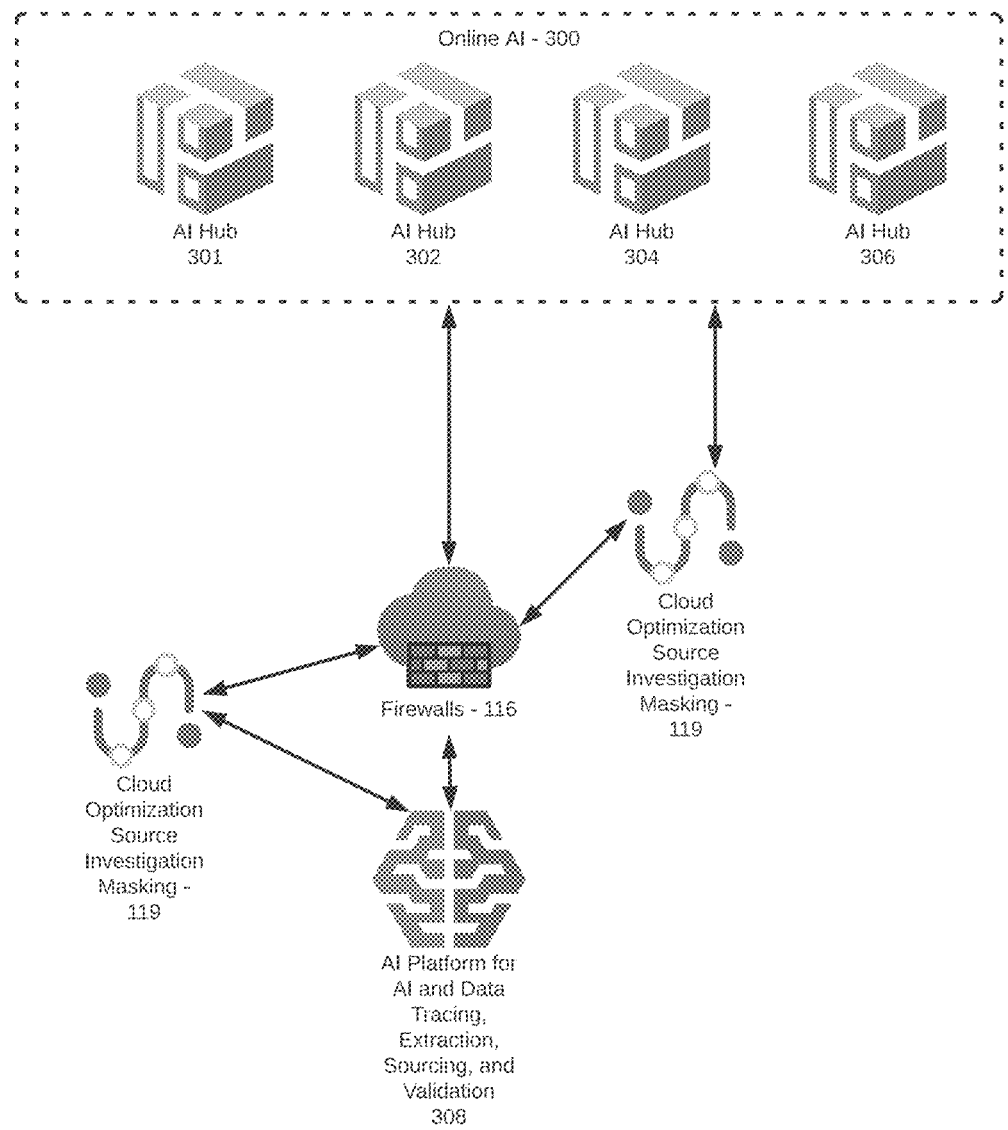
FIG. 3 illustrates sample attempts to recreate suspect content using publicly available AI in an effort track down and source the originating threat actor.

By way of non-limiting example, FIG. 3 illustrates sample attempts to recreate suspect suspect content using publicly available AI in an effort track down and source the originating threat actor. An AI engine 308 can access online AI 300 through firewall(s) 116 directly, or indirectly through cloud optimization source investigation masking processes. The masking may be performed inside or outside the firewall as desired. A VPN may be used to conceal the investigation activity too.

Various publicly available AI engines/hubs/bots 301, 302, 304, 306 may be accessed by AI engine 308 in an effort determine whether any of the bots were able to successfully recreate the suspect content based on the previously collected metadata. Identifying the AI bot that created the maliciously generated AI content will help to further trace the source of the misinformation or manipulated data or the like.

Figure 4:
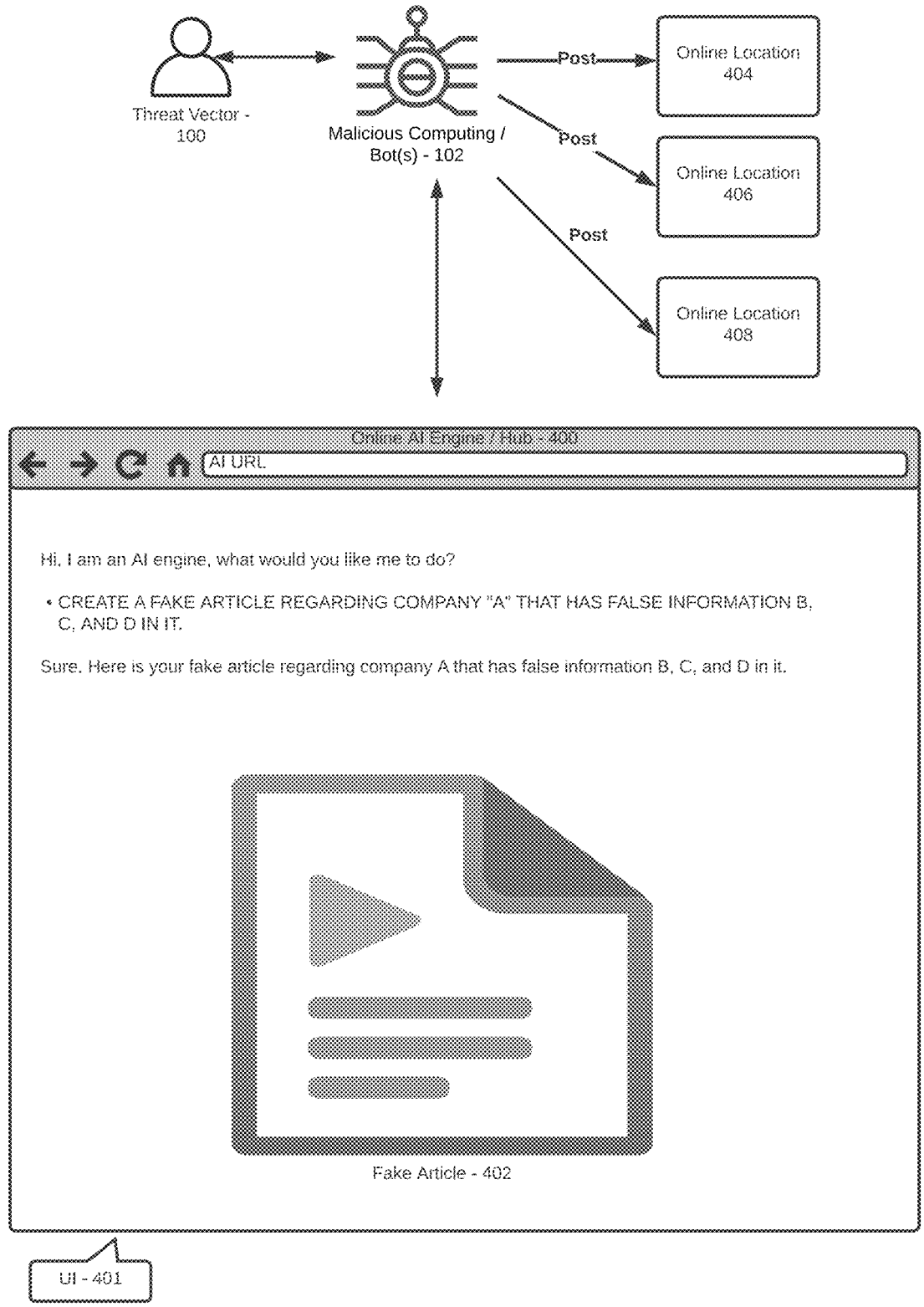
FIG. 4 illustrates malicious use of publicly available AI in order to generate false content and then propagate the false content to online sources.

By way of non-limiting example, FIG. 4 illustrates malicious use of publicly available AI in order to generate false content and then propagate the false content to online sources. The threat vector/actor 100 can directly (not shown) or through a malicious computing bot 102 or the like access an online AI engine/hub 400.

As illustrated in user interface 401 The threat actor may be presented with a prompt such as "Hi, I am an AI engine, what would you like me to do?"

The threat actor may respond with something like "CREATE A FAKE ARTICLE REGARDING COMPANY "A" THAT HAS FALSE INFORMATION B, C, AND D IN IT."

The AI engine may then generate a fake article 402 or the like, which the threat actor or its bot can then post to online locations 404, 406, 408.

Figure 5:
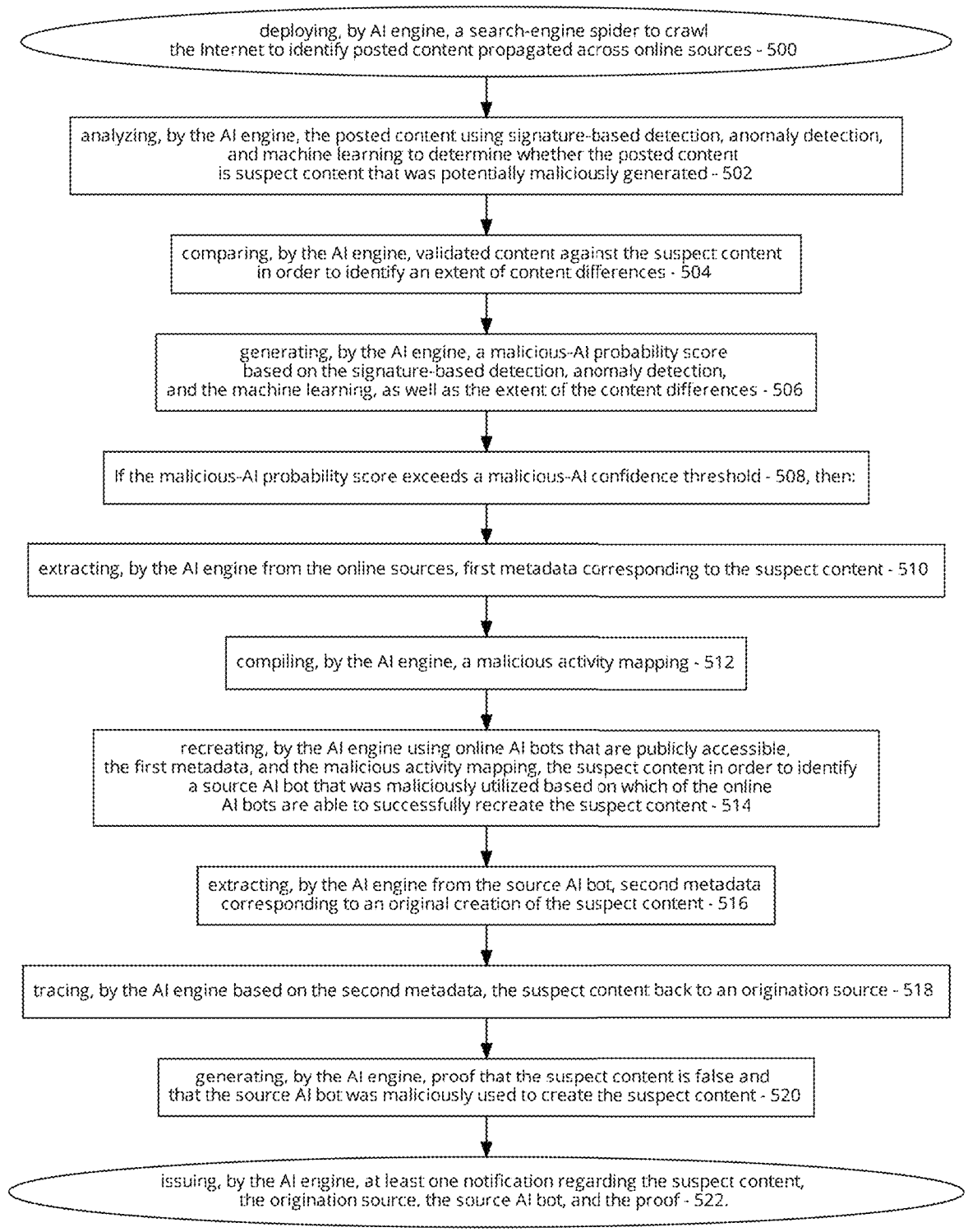
FIG. 5 illustrates sample steps or processes that may be utilized in accordance with one or more information security aspects of this disclosure as it pertains to detection, validation, sourcing, and/or remediation of malicious AI-generated content propagated across the Internet via a plurality of online sites.

By way of non-limiting example, FIG. 5 illustrates sample steps or processes that may be utilized in accordance with one or more information security aspects of this disclosure as it pertains to detection, validation, sourcing, and/or remediation of malicious AI-generated content propagated across the Internet via a plurality of online sites.

In this example, the information-security process for detection, validation, and sourcing of malicious AI-generated content distributed on the Internet can be implemented in one or more steps such as, for example: deploying, by AI engine, a search-engine spider to crawl the Internet to identify posted content propagated across online sources—500; analyzing, by the AI engine, the posted content using signature-based detection, anomaly detection, and machine learning to determine whether the posted content is suspect content that was potentially maliciously generated—502; comparing, by the AI engine, validated content against the suspect content in order to identify an extent of content differences—504; generating, by the AI engine, a malicious-AI probability score based on the signature-based detection, anomaly detection, and the machine learning, as well as the extent of the content differences—506. If the malicious-AI probability score exceeds a malicious-AI confidence threshold—508, extracting, by the AI engine from the online sources, first metadata corresponding to the suspect content—510; compiling, by the AI engine, a malicious activity mapping—512; recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content—514; extracting, by the AI engine from the source AI bot, second metadata corresponding to an original creation of the suspect content—516; tracing, by the AI engine based on the second metadata, the suspect content back to an origination source—518; generating, by the AI engine, proof that the suspect content is false and that the source AI bot was maliciously used to create the suspect content—520; and issuing, by the AI engine, at least one notification regarding the suspect content, the origination source, the source AI bot, and the proof—522.

If desired, the machine learning can perform pattern recognition that is utilized by the AI engine in order to contribute to generation of the malicious-AI probability score.

The process may include performing, by the AI engine based on the malicious activity mapping and the first metadata, a trend analysis to determine whether negative activity as a result of the suspect content is trending increasingly negative based on time.

Additionally, if desired, the malicious-AI probability score may be based on comparison to historical data relating to previously detected malicious campaigns.

Various types of metadata may include, inter alia, a post time, a post date, a posting IP address, posting user indicia, post keywords, other posts, posting frequencies and intervals, and other relevant information and indica.

Suspect content may include text, code, data, images, and/or videos, some portions or all of which may be false or maliciously created or manipulated. Similarly, validated data stores may include valid text, valid code, valid data, valid images, and/or valid videos.

Countermeasures also may be implemented or deployed in order to prevent or attempt to prevent further access to the source AI bot from the origination source, and/or to preempt access by the origination source to one or more of the other online AI bots.

Figure 6:
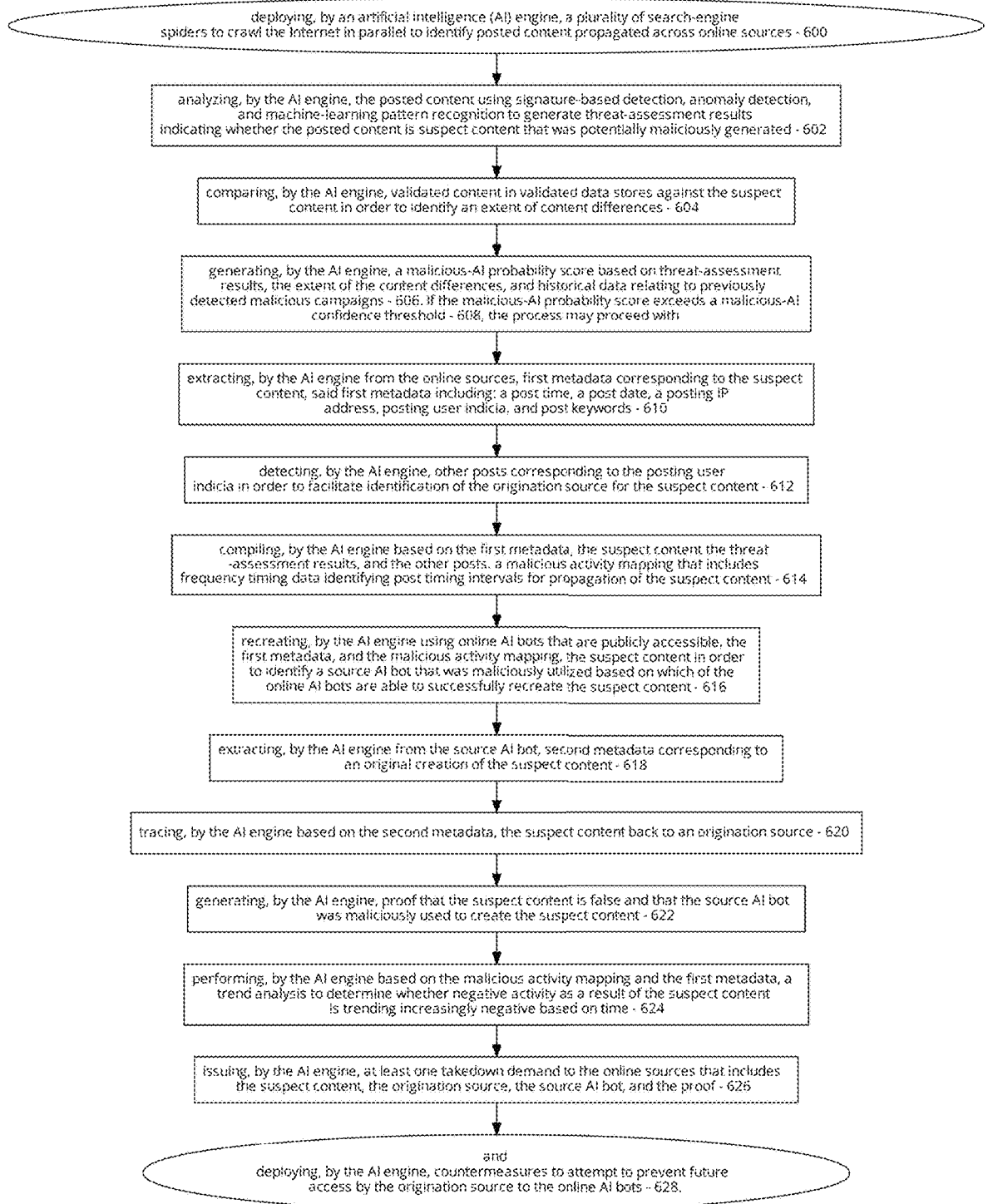
FIG. 6 provides another illustration of sample steps or processes that may be utilized in accordance with one or more information security aspects of this disclosure as it pertains to detection, validation, sourcing, and/or remediation of malicious AI-generated content propagated across the Internet via a plurality of online sites.

By way of non-limiting example, FIG. 6 provides another illustration of sample steps or processes that may be utilized in accordance with one or more information security aspects of this disclosure as it pertains to detection, validation, sourcing, and/or remediation of malicious AI-generated content propagated across the Internet via a plurality of online sites.

In this example, the automated, real-time, information-security process for detection, validation, sourcing, and remediation of malicious AI-generated content distributed on the Internet can be implemented in one or more steps such as, for example: deploying, by an artificial intelligence (AI) engine, a plurality of search-engine spiders to crawl the Internet in parallel to identify posted content propagated across online sources—600; analyzing, by the AI engine, the posted content using signature-based detection, anomaly detection, and machine-learning pattern recognition to generate threat-assessment results indicating whether the posted content is suspect content that was potentially maliciously generated—602; comparing, by the AI engine, validated content in validated data stores against the suspect content in order to identify an extent of content differences—604; generating, by the AI engine, a malicious-AI probability score based on threat-assessment results, the extent of the content differences, and historical data relating to previously detected malicious campaigns—606. If the malicious-AI probability score exceeds a malicious-AI confidence threshold—608, the process may proceed with extracting, by the AI engine from the online sources, first metadata corresponding to the suspect content, said first metadata including: a post time, a post date, a posting IP address, posting user indicia, and post keywords—610; detecting, by the AI engine, other posts corresponding to the posting user indicia in order to facilitate identification of the origination source for the suspect content—612; compiling, by the AI engine based on the first metadata, the suspect content the threat-assessment results, and the other posts, a malicious activity mapping that includes frequency timing data identifying post timing intervals for propagation of the suspect content—614; recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content—616; extracting, by the AI engine from the source AI bot, second metadata corresponding to an original creation of the suspect content—618; tracing, by the AI engine based on the second metadata, the suspect content back to an origination source—620; generating, by the AI engine, proof that the suspect content is false and that the source AI bot was maliciously used to create the suspect content—622; performing, by the AI engine based on the malicious activity mapping and the first metadata, a trend analysis to determine whether negative activity as a result of the suspect content is trending increasingly negative based on time—624; issuing, by the AI engine, at least one takedown demand to the online sources that includes the suspect content, the origination source, the source AI bot, and the proof—626; and deploying, by the AI engine, countermeasures to attempt to prevent future access by the origination source to the online AI bots—628.

Figure 7:
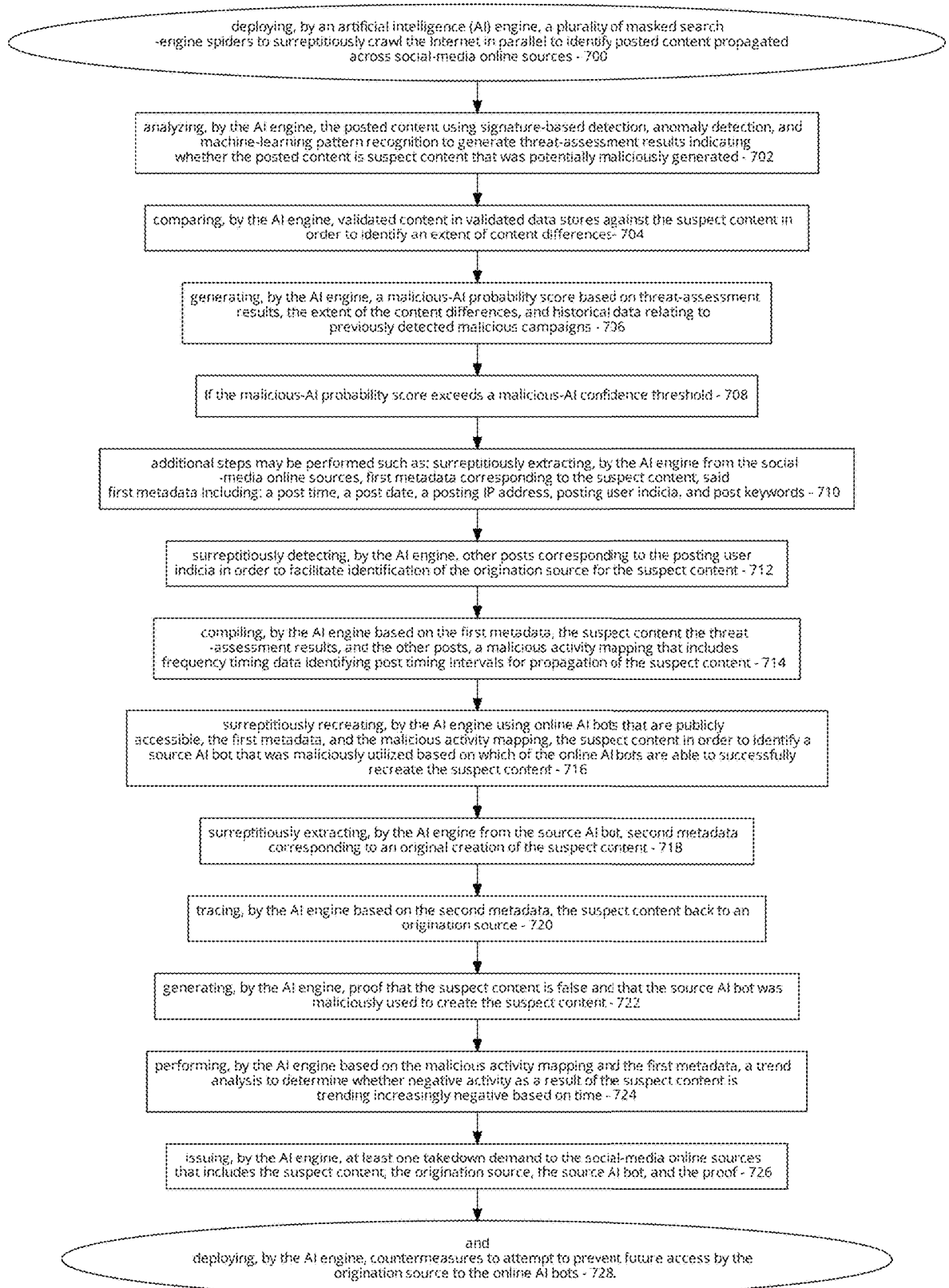
FIG. 7 provides yet another series of sample steps or processes that may be utilized in accordance with one or more information security aspects of this disclosure as it pertains to detection, validation, sourcing, and/or remediation of malicious AI-generated content propagated across the Internet via a plurality of online sites.

By way of non-limiting example, FIG. 7 provides yet another series of sample steps or processes that may be utilized in accordance with one or more information security aspects of this disclosure as it pertains to detection, validation, sourcing, and/or remediation of malicious AI-generated content propagated across the Internet via a plurality of online sites.

In this example, an automated, real-time, information-security process for detection, validation, sourcing, and remediation of malicious AI-generated content distributed on the Internet commences with: deploying, by an artificial intelligence (AI) engine, a plurality of masked search-engine spiders to surreptitiously crawl the Internet in parallel to identify posted content propagated across social-media online sources—700; analyzing, by the AI engine, the posted content using signature-based detection, anomaly detection, and machine-learning pattern recognition to generate threat-assessment results indicating whether the posted content is suspect content that was potentially maliciously generated—702; comparing, by the AI engine, validated content in validated data stores against the suspect content in order to identify an extent of content differences—704; generating, by the AI engine, a malicious-AI probability score based on threat-assessment results, the extent of the content differences, and historical data relating to previously detected malicious campaigns—706. If the malicious-AI probability score exceeds a malicious-AI confidence threshold—708, additional steps may be performed such as: surreptitiously extracting, by the AI engine from the social-media online sources, first metadata corresponding to the suspect content, said first metadata including: a post time, a post date, a posting IP address, posting user indicia, and post keywords—710; surreptitiously detecting, by the AI engine, other posts corresponding to the posting user indicia in order to facilitate identification of the origination source for the suspect content—712; compiling, by the AI engine based on the first metadata, the suspect content the threat-assessment results, and the other posts, a malicious activity mapping that includes frequency timing data identifying post timing intervals for propagation of the suspect content—714; surreptitiously recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content—716; surreptitiously extracting, by the AI engine from the source AI bot, second metadata corresponding to an original creation of the suspect content—718; tracing, by the AI engine based on the second metadata, the suspect content back to an origination source—720; generating, by the AI engine, proof that the suspect content is false and that the source AI bot was maliciously used to create the suspect content—722; performing, by the AI engine based on the malicious activity mapping and the first metadata, a trend analysis to determine whether negative activity as a result of the suspect content is trending increasingly negative based on time—724; issuing, by the AI engine, at least one takedown demand to the social-media online sources that includes the suspect content, the origination source, the source AI bot, and the proof—726; and deploying, by the AI engine, countermeasures to attempt to prevent future access by the origination source to the online AI bots—728.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information-security process for detection, validation, and sourcing of malicious AI-generated content distributed on the Internet comprising the steps of:
  deploying, by an artificial intelligence (AI) engine, a search-engine spider to crawl the Internet to identify posted content propagated across online sources;
  analyzing, by the AI engine, the posted content using signature-based detection, anomaly detection, and machine learning to determine whether the posted content is suspect content that was potentially maliciously generated;
  comparing, by the AI engine, validated content against the suspect content in order to identify an extent of content differences;
  generating, by the AI engine, a malicious-AI probability score based on the signature-based detection, anomaly detection, and the machine learning, as well as the extent of the content differences, and, if the malicious-AI probability score exceeds a malicious-AI confidence threshold:
  extracting, by the AI engine from the online sources, first metadata corresponding to the suspect content;
  compiling, by the AI engine, a malicious activity mapping;
  recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content;
  extracting, by the AI engine from the source AI bot, second metadata corresponding to an original creation of the suspect content;
  tracing, by the AI engine based on the second metadata, the suspect content back to an origination source;
  generating, by the AI engine, proof that the suspect content is false and that the source AI bot was maliciously used to create the suspect content; and
  issuing, by the AI engine, at least one notification regarding the suspect content, the origination source, the source AI bot, and the proof.

2. The information-security process of claim 1 wherein the machine learning performs pattern recognition that is utilized by the AI engine in order to generate malicious-AI probability score.

3. The information-security process of claim 2 further comprising the step of performing, by the AI engine based on the malicious activity mapping and the first metadata, a trend analysis to determine whether negative activity as a result of the suspect content is trending increasingly negative based on time.

4. The information-security process of claim 3 wherein the malicious-AI probability score is further based on comparison to historical data relating to previously detected malicious campaigns.

5. The information-security process of claim 4 wherein the first metadata includes: a post time, a post date, a posting IP address, posting user indicia, and post keywords.

6. The information-security process of claim 5 wherein the suspect content includes at least one false image and the validated data stores include valid images.

7. The information-security process of claim 6 wherein the online sites are social media sites or news outlets.

8. The information-security process of claim 7 further comprising detecting, by the AI engine, other posts corresponding to the posting user indicia in order to help identify the origination source for the suspect content.

9. The information-security process of claim 8 wherein the steps are automated and executed in real time.

10. The information-security process of claim 9 further comprising the step of implementing, by the AI engine, first countermeasures to prevent further access to the source AI bot from the origination source.

11. The information-security process of claim 10 wherein said at least one notification includes an automated take-down demand transmitted to at least one of the online sources.

12. The information-security process of claim 11 further comprising the step of implementing, by the AI engine, second countermeasures to preempt access by the origination source to at least one of the online AI bots.

13. The information-security process of claim 12 wherein the malicious activity mapping includes frequency timing data identifying post timing intervals for propagation of the suspect content.

14. An automated, real-time, information-security process for detection, validation, sourcing, and remediation of malicious AI-generated content distributed on the Internet comprising the steps of:
  deploying, by an artificial intelligence (AI) engine, a plurality of search-engine spiders to crawl the Internet in parallel to identify posted content propagated across online sources;
  analyzing, by the AI engine, the posted content using signature-based detection, anomaly detection, and machine-learning pattern recognition to generate threat-assessment results indicating whether the posted content is suspect content that was potentially maliciously generated;
  comparing, by the AI engine, validated content in validated data stores against the suspect content in order to identify an extent of content differences;
  generating, by the AI engine, a malicious-AI probability score based on threat-assessment results, the extent of the content differences, and historical data relating to previously detected malicious campaigns, and, if the malicious-AI probability score exceeds a malicious-AI confidence threshold:
  extracting, by the AI engine from the online sources, first metadata corresponding to the suspect content, said first metadata including: a post time, a post date, a posting IP address, posting user indicia, and post keywords;
  detecting, by the AI engine, other posts corresponding to the posting user indicia in order to facilitate identification of the origination source for the suspect content;
  compiling, by the AI engine based on the first metadata, the suspect content the threat-assessment results, and the other posts, a malicious activity mapping that includes frequency timing data identifying post timing intervals for propagation of the suspect content;

recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content;

extracting, by the AI engine from the source AI bot, second metadata corresponding to an original creation of the suspect content;

tracing, by the AI engine based on the second metadata, the suspect content back to an origination source;

generating, by the AI engine, proof that the suspect content is false and that the source AI bot was maliciously used to create the suspect content;

performing, by the AI engine based on the malicious activity mapping and the first metadata, a trend analysis to determine whether negative activity as a result of the suspect content is trending increasingly negative based on time;

issuing, by the AI engine, at least one takedown demand to the online sources that includes the suspect content, the origination source, the source AI bot, and the proof; and deploying, by the AI engine, countermeasures to attempt to prevent future access by the origination source to the online AI bots.

15. The information-security process of claim 14 wherein the online sources are social media sites.

16. The information-security process of claim 14 wherein the online sources are news outlets.

17. The information-security process of claim 15 wherein the suspect content includes at least one false image and at least one false video and the validated data stores include at least one valid image and at least one valid video.

18. An automated, real-time, information-security process for detection, validation, sourcing, and remediation of malicious AI-generated content distributed on the Internet comprising the steps of:

deploying, by an artificial intelligence (AI) engine, a plurality of masked search-engine spiders to surreptitiously crawl the Internet in parallel to identify posted content propagated across social-media online sources;

analyzing, by the AI engine, the posted content using signature-based detection, anomaly detection, and machine-learning pattern recognition to generate threat-assessment results indicating whether the posted content is suspect content that was potentially maliciously generated;

comparing, by the AI engine, validated content in validated data stores against the suspect content in order to identify an extent of content differences;

generating, by the AI engine, a malicious-AI probability score based on threat-assessment results, the extent of the content differences, and historical data relating to previously detected malicious campaigns, and, if the malicious-AI probability score exceeds a malicious-AI confidence threshold:

surreptitiously extracting, by the AI engine from the social-media online sources, first metadata corresponding to the suspect content, said first metadata including: a post time, a post date, a posting IP address, posting user indicia, and post keywords;

surreptitiously detecting, by the AI engine, other posts corresponding to the posting user indicia in order to facilitate identification of the origination source for the suspect content;

compiling, by the AI engine based on the first metadata, the suspect content the threat-assessment results, and the other posts, a malicious activity mapping that includes frequency timing data identifying post timing intervals for propagation of the suspect content;

surreptitiously recreating, by the AI engine using online AI bots that are publicly accessible, the first metadata, and the malicious activity mapping, the suspect content in order to identify a source AI bot that was maliciously utilized based on which of the online AI bots are able to successfully recreate the suspect content;

surreptitiously extracting, by the AI engine from the source AI bot, second metadata corresponding to an original creation of the suspect content;

tracing, by the AI engine based on the second metadata, the suspect content back to an origination source;

generating, by the AI engine, proof that the suspect content is false and that the source AI bot was maliciously used to create the suspect content;

performing, by the AI engine based on the malicious activity mapping and the first metadata, a trend analysis to determine whether negative activity as a result of the suspect content is trending increasingly negative based on time;

issuing, by the AI engine, at least one takedown demand to the social-media online sources that includes the suspect content, the origination source, the source AI bot, and the proof; and deploying, by the AI engine, countermeasures to attempt to prevent future access by the origination source to the online AI bots.

19. The information-security process of claim 18 wherein the suspect content includes at least one false image and the validated data stores include at least one valid image.

20. The information-security process of claim 19 wherein the suspect content includes at least one false video and the validated data stores include at least one valid video.

* * * * *